UNITED STATES PATENT OFFICE.

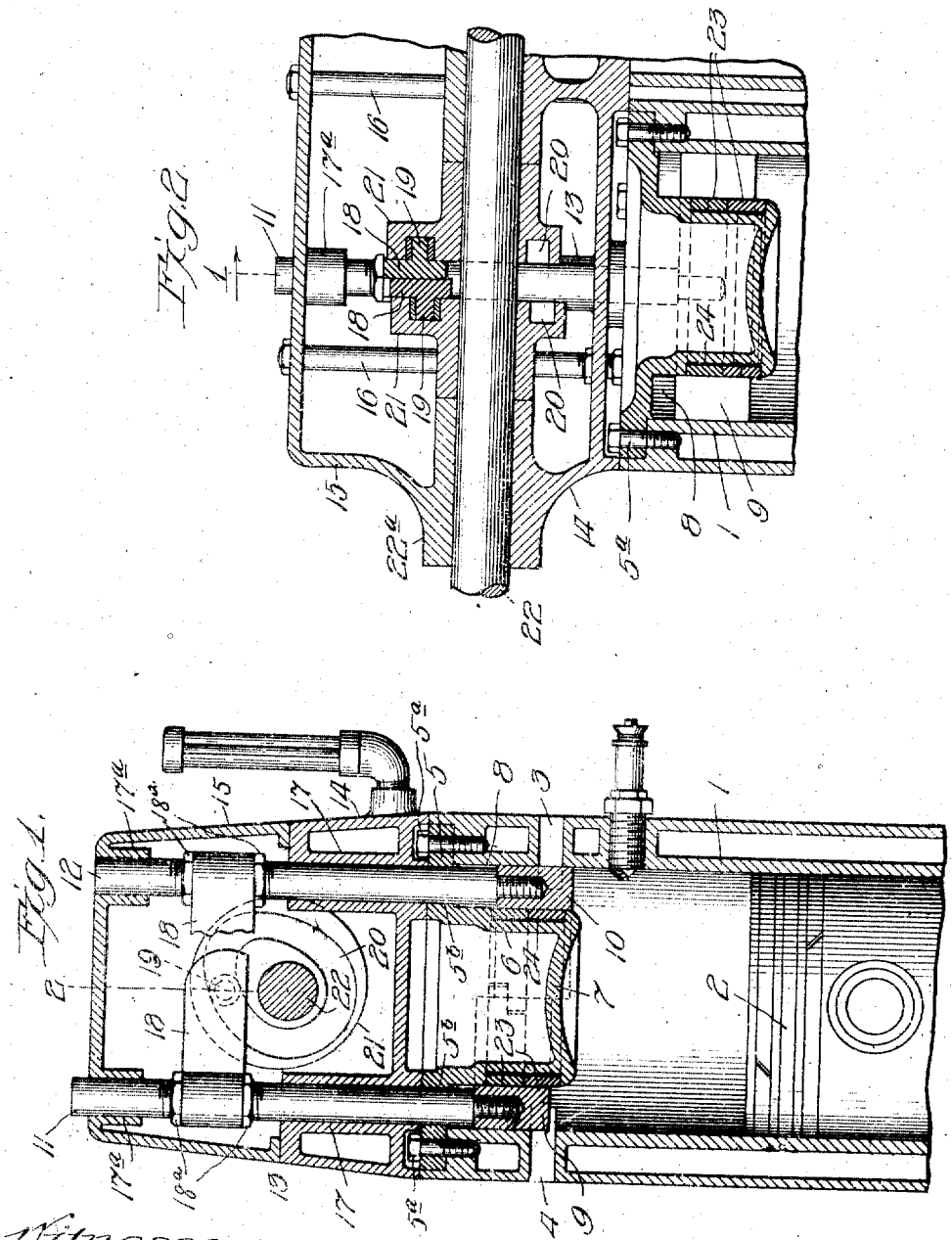

LOUIS PLEIN, OF CHICAGO, ILLINOIS.

INTERNAL-COMBUSTION ENGINE.

1,244,890.

Specification of Letters Patent. Patented Oct. 30, 1917.

Application filed April 2, 1914. Serial No. 828,983.

*To all whom it may concern:*

Be it known that I, LOUIS PLEIN, a subject of the Grand Duke of Luxemburg, residing at Chicago, in the county of Cook and State of Illinois, have invented certain new and useful Improvements in Internal-Combustion Engines, of which the following is a specification.

Certain features of this invention relate to internal combustion engines of the type wherein sliding sleeves or rings are employed to control the inlet and exhaust ports. In prior constructions the sleeves or rings have usually been so arranged that a considerable area thereof was exposed to the burning gases. It is one of the objects of this invention to provide a valve mechanism of the sliding sleeve or ring type wherein the valve elements are exposed to a comparatively slight extent to the combustion, and wherein the valve elements in their opening movement move away from the combustion space and into a relatively cooler location.

Another object of the invention is to arrange the parts with which the valve elements are in contact so that said parts may be effectively cooled.

Another object of the invention is to provide improved means for preventing leakage past the valve elements.

A further object of the invention is to provide improved means for lubricating the valve-operating mechanism.

In the accompanying drawings, Figure 1 is a fragmental central sectional view of an engine embodying the features of my invention, the view being taken in the plane of dotted line 1 of Fig. 2. Fig. 2 is a fragmental sectional view taken in the plane of dotted line 2 of Fig. 1.

In the drawings, 1 denotes the engine cylinder, 2 the piston, 3 the inlet port and 4 the exhaust port. The inlet port and exhaust port are in the same transverse plane and are preferably, although not necessarily located opposite each other in the walls of the cylinder 1. The upper or combustion end of the cylinder is closed by means of a head consisting of an annular flange 5, a hollow substantially cylindrical portion 6 extending inwardly from the flange 5 to a point below the inlet and outlet openings in the cylinder, and a wall 7 which closes the inner end of the cylindrical portion 6. The cylinder head is secured to the cylinder by suitable means, such as screws 5ª extending through the flange 5. If desired, the wall 7 may be so formed as to present a concave surface to the combustion space. The inwardly extending cylindrical portion 6 and the upper end of the cylinder 1 form a valve casing or annular space 8 extending away from the combustion space, the ports 3 and 4 opening into said annular space.

The cylinder 1 may, if desired, be water-jacketed in any ordinary or preferred manner, and the interior of the cylindrical portion 6 may communicate in any suitable way with the water-circulating system so as to be cooled by the flowing water.

The valves for covering and uncovering the ports 3 and 4 consist of two half-rings 9 and 10, which together constitute a complete ring having a gas-tight fit within the annular space 8. Said half-rings may be laterally reciprocated to cover and uncover the ports 3 and 4 by any suitable means, that herein shown consisting of valve stems 11 and 12 secured to the valve members 9 and 10, respectively, said stems extending through openings 5ᵇ in the cylinder head.

The valve operating mechanism is inclosed in a casing 13 consisting of two sections 14 and 15, the section 15 fitting upon the section 14, and both sections being secured to the end of the cylinder by means of bolts 16. In the casing section 14 are formed bearings or tubular guides 17 for the valve stems 11 and 12, similar guides 17ª being provided in the section 15. Within the casing section 15 the valve stems 11 and 12 are provided with arms 18, each of said arms having a roller stud 19. Said roller studs run within the cam grooves 20 of two cam disks 21, said disks being mounted upon a cam shaft 22. Said shaft is mounted in bearings 22ª formed between the casing sections 14 and 15, and may be driven from the crank-shaft by any suitable or ordinary means. The shaft 22 is driven at such a speed and the cam disks 21 are set in such relation to each other on the shaft 22 that the members 9 and 10 are moved to produce the desired cycle of operation. As the shaft 22 is revolved the valve members 9 and 10, are reciprocated in the space 8 to cover and uncover the ports 3 and 4.

In order that the inlet and outlet openings will not be unduly restricted by reason of the fact that they lead into and through the annular space, said space is made of substantial width. It will thus be evident that when the valves are actuated to open and close said openings, the gases are free to travel substantially in a diagonal path through the openings as distinguished from traveling in a rectangular path as would otherwise be necessary.

To prevent leakage past the valve members 9 and 10, I provide suitable packing means such as two split rings 23, said rings lying side by side within an annular peripheral groove 24 formed in the cylindrical portion 6. The packing rings exert pressure against the inner or concave side of the valve members 9 and 10 and serve to hold said valve members in fluid-tight contact with the outer annular wall of the space 8.

The casing 13 is adapted and intended to contain a suitable quantity of lubricating oil. The splashing of the oil as the cam disks 21 revolve causes the cams to be thoroughly lubricated and causes oil to be thrown upon the valve stems 11 and 12, the oil being carried into the bearings 17 and 17ª.

It will be noted that only the lower sides of the valve members are exposed to the fire, and that when the valve members move to uncover the ports, said valve members move in the direction away from the combustion space and hence into a cooler space. The valve member 10, moreover, is cooled by the inrush of the combustible mixture through the port 3. Both of the walls defining the space 8 are water-cooled, and thus serve to protect the valve members from excessive heat. The cylindrical portion 106 of the head extends to a point below the inlet and outlet ports and below the lowermost position of the valve members, and by reason of the snug fit of the valve members in the annular space, the cooling agent in the hollow head and cylinder jacket serves to the maximum of efficiency in maintaining the valve members cool. Only the extreme lower edges of the valve members are exposed to the burning gases in the combustion chamber.

When the exhaust valve 9 is being opened, the high pressure in the cylinder operates upon said valve like a piston to force it upwardly and thus deliver power to the cam shaft 22.

During the downward movement of either of the valve members, rarefaction of the gas in the portion of the annular space 8 above the valve members will occur, whereupon the then greater pressure in the oil casing 14, 15 will act to force the oil down between the valve stems 11, 12 and their bearings. A positive feed of lubricant to the stems is thereby accomplished.

The arms 18 are adjustably secured to the valve stems 11 and 12 by means of the nuts 18ª, said nuts affording means to permit adjustment of the valve members 9 and 10 with relation to the ports 3 and 4 and the cam shaft 22.

It will be understood that while I have described the present embodiment of this invention with considerable particularity, the invention is not limited to the precise construction and arrangement shown, and that various changes may be made without departing from the spirit and scope of my invention, as is set forth in the appended claims.

I claim as my invention:

1. An internal-combustion engine having, in combination, a cylinder, a head closing the combustion end of the cylinder and having a cylindrical portion extending into the cylinder, the cylinder wall and said cylindrical portion forming between them an annular space of substantial width, the cylinder having an inlet and an outlet in opposite sides thereof communicating directly with said annular space above the lower end of said cylindrical portion, two independently slidable valve members, each in the form of a half ring, having their ends abutting to form a complete ring which has a gas-tight fit between the walls of said annular space and is adapted to operate wholly within said space whereby leakage of gas along the valve members is prevented and only the lower edges of the valve members are exposed to the pressure in the combustion end of the cylinder, said valve members being arranged to control said inlet and said outlet, respectively, stems fixed to said valve members and passing upwardly through said head, and means for operating said stems and the valve members, said valve members acting as pistons which are controlled by the pressure in the combustion chamber whereby to deliver power to said operating means.

2. In an internal-combustion engine, a cylinder, a hollow water-cooled cylinder head secured to the cylinder, said head providing a valve-receiving space between the head and the cylinder, valve members in said space, an oil casing secured to the end of the cylinder and forming a cover for the water space of the cylinder head, valve stems secured to the valve members and extending through openings in the cylinder head and into said casing, and means in said casing to operate the valve stems.

3. In an internal-combustion engine, a cylinder, a head secured to the end of the cylinder, said head providing a valve-receiving space between the head and the cylinder wall, two casing sections secured to the end of the cylinder, one of the casing sections being superposed upon the other casing section, valve members in said valve-receiving space, stems secured to said valve members and extending through openings in the cylinder head, the lower casing section having tubular guides for said valve stems, a cam shaft in said casing, said casing having bearings for said shaft, cams on said cam shaft, and members carried by said valve stems for engagement by said cams.

4. An internal combustion engine having, in combination, a cylinder, a head closing the combustion end of the cylinder and having an inwardly extending cylindrical portion, the cylinder wall and said cylindrical portion forming between them an annular space of substantial width, the inner end of which opens into the combustion chamber of the cylinder, the cylinder having an inlet and an outlet in opposite sides thereof communicating directly with said annular space, two independently slidable valve members, each in the form of a half ring, having their ends abutting to form a complete ring having a gas-tight fit between the walls of said annular space, said valve members being arranged to control said inlet and said outlet, respectively, said head extending to a point below said inlet and outlet and below the lowermost position of said valve members so that only the lower edges of said valve members are exposed to the pressure in the combustion end of the cylinder, stems fixed to said valve members and extending upwardly slidably through said heads, an oil casing into which the outer portions of said stems extend, and means in said casing for operating said stems, said valve members acting as pistons to draw in oil from said oil chamber along said stems.

5. An internal-combustion engine having, in combination, a cylinder, a head closing the combustion end of the cylinder and having an inwardly-extending cylindrical portion, the cylinder wall and said cylindrical portion forming between them an annular space of substantial width, the inner end of which opens into the combustion chamber of the cylinder, the cylinder having an inlet and an outlet in opposite sides thereof communicating directly with said annular space, two independently-slidable valve members each in the form of a half-ring having their ends abutting to form a complete ring occupying said annular space, said valve members being arranged to control said inlet and said outlet, respectively, said head extending to a point below said inlet and outlet and below the lowermost position of said valve members so that only the lower edges of said valve members are exposed to the pressure in the combustion chamber, the inwardly-extending cylindrical portion of the cylinder being peripherally grooved, a packing ring in said groove lying in contact with the inner surfaces of said valve members, and means for operating said valve members.

6. An internal-combustion engine having, in combination, a cylinder, a head closing the combustion end of the cylinder and having an inwardly-extending cylindrical portion, the cylinder wall and said cylindrical portion forming between them an annular space of substantial width, the inner end of which opens into the combustion chamber of the cylinder, the cylinder having an inlet and an outlet in opposite sides thereof communicating directly with said annular space, two independently-slidable valve members, each in the form of a half-ring, having their ends abutting to form a complete ring having a gas-tight fit between the walls of said annular space, said valve members being arranged to control said inlet and said outlet, respectively, said head extending to a point below said inlet and outlet and below the lowermost position of said valve members so that only the lower edges of said valve members are exposed to the pressure in the combustion chamber, said cylinder being water-jacketed and said cylindrical portion of the head being hollow so that the walls on both sides of said annular space may be directly contacted by the cooling medium, and means for operating said valve members.

7. An internal-combustion engine having, in combination, a cylinder, a head closing the combustion end of the cylinder and having a cylindrical portion extending into the cylinder, the cylinder wall and said cylindrical portion forming between them an annular space of substantial width, the cylinder having an inlet and outlet in opposite sides thereof communicating directly with said annular space above the lower end of said cylindrical portion, two independently-slidable valve members, each in the form of a half-ring having their ends abutting to form a complete ring which has a gas-tight fit between the walls of said annular space whereby leakage of gas along the valve members is prevented and only the lower edges of the valve members are exposed to the pressure in the combustion end of the cylinder, said valve members being arranged to control said inlet and said outlet, respectively, and means for operating said valve members.

8. An internal combustion engine having, in combination, a cylinder, a head closing the upper end of the cylinder and having a cylindrical portion extending into the cylinder, the cylindrical portion of the head together with the wall of the cylinder being spaced apart to form an annular valve casing of substantial width whose upper end is closed by the cylinder head and whose lower end opens into the cylinder, said valve casing having an inlet and an outlet opening in its opposite sides, said openings being located in the same lateral plane above the lower end of the cylinder head, two independently slidable imperforate valve members adapted to form a complete ring having a gas-tight fit with the sides of the valve casing and adapted to operate wholly within the valve casing, means for cooling the sides of the valve casing, and means for operating the valve members to alternately open and close the inlet and outlet openings in the valve casing.

In testimony whereof, I hereunto set my hand in the presence of two witnesses.

LOUIS PLEIN.

In the presence of—
C. PAUL PARKER,
GEORGE L. CHINDAHL.